United States Patent
Tang

(10) Patent No.: US 10,863,549 B2
(45) Date of Patent: Dec. 8, 2020

(54) RANDOM ACCESS METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/383,293

(22) Filed: Apr. 12, 2019

(65) Prior Publication Data

US 2019/0239257 A1    Aug. 1, 2019

Related U.S. Application Data

(63) Continuation of application No. PCT/CN2016/108448, filed on Dec. 2, 2016.

(51) Int. Cl.
*H04W 74/08* (2009.01)
*H04W 76/11* (2018.01)
(Continued)

(52) U.S. Cl.
CPC ....... *H04W 74/0833* (2013.01); *H04W 24/08* (2013.01); *H04W 72/046* (2013.01); *H04W 76/11* (2018.02); *H04W 88/023* (2013.01)

(58) Field of Classification Search
CPC . H04W 74/0833; H04W 76/11; H04W 24/08; H04W 72/046; H04W 88/023
See application file for complete search history.

(56) References Cited

U.S. PATENT DOCUMENTS

2015/0282215 A1   10/2015   Eriksson et al.
2016/0029358 A1   1/2016    Hou et al.
(Continued)

FOREIGN PATENT DOCUMENTS

CN    105379357       3/2016
CN    105637939 A     6/2016
(Continued)

OTHER PUBLICATIONS

EPO, Office Action for EP Application No. 16922727.9, dated Feb. 12, 2020.
(Continued)

*Primary Examiner* — Hassan Kizou
*Assistant Examiner* — Abdullahi Ahmed
(74) *Attorney, Agent, or Firm* — Hodgson Russ LLP

(57) ABSTRACT

Embodiments of the present application provide a random access method and device, which can enable a terminal device to accurately determine its random access response (RAR). The method includes: a terminal device sends a random access request message to a network device, the random access request message carrying a random access preamble; determine a random access-radio network temporary identifier (RA-RNTI) according to at least one of information of a resource occupied by the random access request message, information of a resource occupied by an RAR to be monitored, other signals borne by a resource occupied by the RAR to be monitored, and information, apart from the random access preamble, carried in the random access request message; monitor, by using the RA-RNTI, the RAR to be monitored which is sent by the network device.

17 Claims, 4 Drawing Sheets

(51) Int. Cl.
  *H04W 24/08*  (2009.01)
  *H04W 72/04*  (2009.01)
  *H04W 88/02*  (2009.01)

(56) References Cited

U.S. PATENT DOCUMENTS

2016/0192401 A1   6/2016  Park et al.
2017/0195033 A1   7/2017  Zhang et al.
2019/0104549 A1*  4/2019  Deng .................... H04B 7/0617
2019/0207737 A1*  7/2019  Babaei ................ H04L 27/2607
2019/0239255 A1   8/2019  Stern-Berkowitz et al.
2019/0261429 A1*  8/2019  Hu ........................ H04W 76/27
2019/0327764 A1* 10/2019  Yoo ..................... H04W 74/085

FOREIGN PATENT DOCUMENTS

| | | |
|---|---|---|
| EP | 3198973 | 8/2017 |
| WO | 2016025899 | 2/2016 |
| WO | 2016044991 | 3/2016 |
| WO | 2016045715 | 3/2016 |

OTHER PUBLICATIONS

EPO, EESR for EP Application No. 16922727, dated Jul. 12, 2019.
WIPO, ISR for PCT/CN2016/108448, dated Aug. 25, 2017.

* cited by examiner

RANDOM ACCESS METHOD, TERMINAL DEVICE, AND NETWORK DEVICE

CROSS-REFERENCE TO RELATED APPLICATIONS

This application is a continuation of International Application No. PCT/CN2016/108448, filed Dec. 2, 2016, the entire disclosure of which is incorporated herein by reference.

TECHNICAL FIELD

The present application relates to the field of communication, and more particularly, to a method for random access, a terminal device and a network device.

BACKGROUND

In the existing Long Term (LTE) system, when a network device detects a random access preamble sent by a terminal device, the network device will send a Random Access Response (RAR) message in a Physical Downlink Shared Channel (PDSCH). The RAR message includes an index number of a random access preamble sequence detected by the network device, time adjustment information for uplink synchronization, initial allocation of uplink resource (for sending subsequent msg3) and a temporary Cell-Radio Network Temporary Identifier (C-RNTI).

After sending the random access preamble, the terminal device needs to use a Random Access-Radio Network Temporary Identifier (RA-RNTI) to monitor a Physical Downlink Control Channel (PDCCH) to receive its own RAR message.

How to use the RA-RNTI to enable the terminal device accurately determine its own RAR is an urgent problem to be solved.

SUMMARY

Embodiments of the present application provide methods and devices for random access.

In a first aspect, there is provided a method for random access, comprising:

sending, by a terminal device, a random access request message to a network device, wherein the random access request message carries a random access preamble;

determining a Random Access-Radio Network Temporary Identifier (RA-RNTI) based on at least one of: information of resource occupied by the random access request message, information of resource occupied by a random access response to be monitored, other signals carried by the resource occupied by the random access response to be monitored, the random access preamble, and information carried by the random access request message except the random access preamble;

monitoring, with the RA-RNTI, the random access response to be monitored which is sent by the network device.

In a second aspect, there is provided a method for random access, comprising:

receiving, by a network device, a random access request message sent by a terminal device, wherein the random access request message carries a random access preamble;

determining a Random Access-Radio Network Temporary Identifier (RA-RNTI) based on at least one of: information of resource occupied by the random access request message, information of resource occupied by a random access response to be sent, other signals carried by the resource occupied by the random access response to be sent, the random access preamble and information carried by the random access request message except the random access preamble;

sending, by the network device, the random access response to be sent to the terminal device with the RA-RNTI.

In a third aspect, there is provided a terminal device which may include units for performing methods in the first aspect or any one of optional implementations thereof.

In a fourth aspect, there is provided a network device comprising units for performing methods in the second aspect or any one of optional implementations thereof.

In a fifth aspect, there is provided a terminal device which may include a transceiver and a processor and perform methods in the first aspect or any one of optional implementations thereof.

In a sixth aspect, there is provided a network device which may include a transceiver and a processor and perform methods in the second aspect or any one of optional implementations thereof.

In a seventh aspect, there is provided a computer-readable medium used for storing a program code to be performed by a terminal device, wherein the program code comprises instructions for performing methods in the first aspect or possible implementations thereof.

In an eighth aspect, there is provided a computer-readable medium used for storing a program code to be performed by a network device, wherein the program code comprises instructions for performing methods in the second aspect or possible implementations thereof.

In a ninth aspect, there is provided a system on a chip comprising an input interface, an output interface, a processor and a memory, wherein the processor is configured to perform a code in the memory and to implement methods in the first aspect or possible implementations thereof when the code is executed.

In a tenth aspect, there is provided a system on a chip comprising an input interface, an output interface, a processor and a memory, wherein the processor is configured to perform a code in the memory and to implement methods in the second aspect or possible implementations thereof when the code is executed.

BRIEF DESCRIPTION OF THE DRAWINGS

Accompanying drawings used to describe embodiments or the prior art will be introduced briefly below in order to illustrate the technical solutions of embodiments of the present application more clearly. Obviously, the accompanying drawings in the following description are merely for some embodiments of the present application, and other drawings can also be obtained based on these accompanying drawings by a person having ordinary skill in the art without creative efforts.

DETAILED DESCRIPTION

The technical solutions in embodiments of the present application will be described in the following in combination with accompanying drawings os the embodiments of the present application.

Embodiments of the present application can be applied in various kinds of communication systems such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or a future 5G system, and so on.

Figure 1:
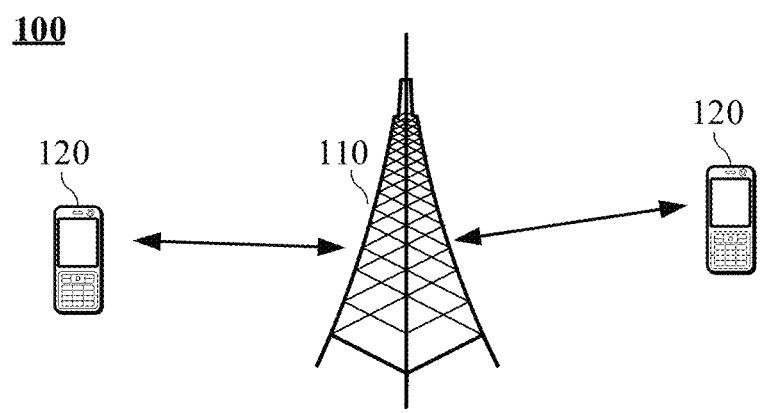
FIG. 1 is a schematic diagram of a communication system according to embodiments of the present application.

FIG. 1 illustrates a wireless communication system 100 applied in embodiments of the present application. The wireless communication system 100 can include a network device 110 which is a device capable to communicate with a terminal device. The network device 110 can provide communication coverage for a specific geographic area and communicate with terminal devices (for example, UEs) located in the coverage. Optionally, the network device 110 may be a BTS (Base Transceiver Station) in GSM (Global System for Mobile Communications) or CDMA (Code Division Multiple Access) system, an NB (NodeB) in a WCDMA (Wideband Code Division Multiple Access) system, an eNB or eNodeB (Evolutional Node B) in an LTE system, or a wireless controller in a CRAN (Cloud Radio Access Network). Alternatively, the network device may be a relay station, an access point, a vehicle-mounted device, a wearable device, a network device in a future 5G network, a network device in a future evolved PLMN (Public Land Mobile Network), or the like.

The wireless communication system 100 further includes at least one terminal device 120 located in the coverage of the network device 110. The terminal device 120 may be moving or stationary. Optionally, the terminal device 120 may be an access terminal, a UE (User Equipment), a user unit, a user station, a mobile radio station, a mobile station, a remote station, a remote terminal, a mobile device, a user terminal, a terminal, a wireless communication device, a user agent or a user device. An access terminal may be a cell phone, a cordless phone, an SIP (Session Initiation Protocol) phone, a WLL (Wireless Local Loop) station, a PDA (Personal Digital Assistant), a hand-held device with a wireless communication function, a computing device or other processing devices connected to a wireless modem, a vehicle-mounted device, a wearable device, a terminal device in a future 5G network, a terminal device in a future evolved PLMN (Public Land Mobile Network), or the like.

Optionally, a 5G system or network may also be called as a NR (New Radio) system or network.

FIG. 1 exemplarily illustrates one network device and two terminal devices. Alternatively, the wireless communication system 100 may include multiple network devices, the coverage of each of which may cover other numbers of terminal devices. Embodiments of the present application do not have any limit on this.

Alternatively, the wireless communication system 100 may further include other network entities such as a network controller, a mobility management entity, and the like. Embodiments of the present application do not have any limit on this.

It should be understood that the terms "system" and "network" herein are exchangeable. The term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

Figure 2:
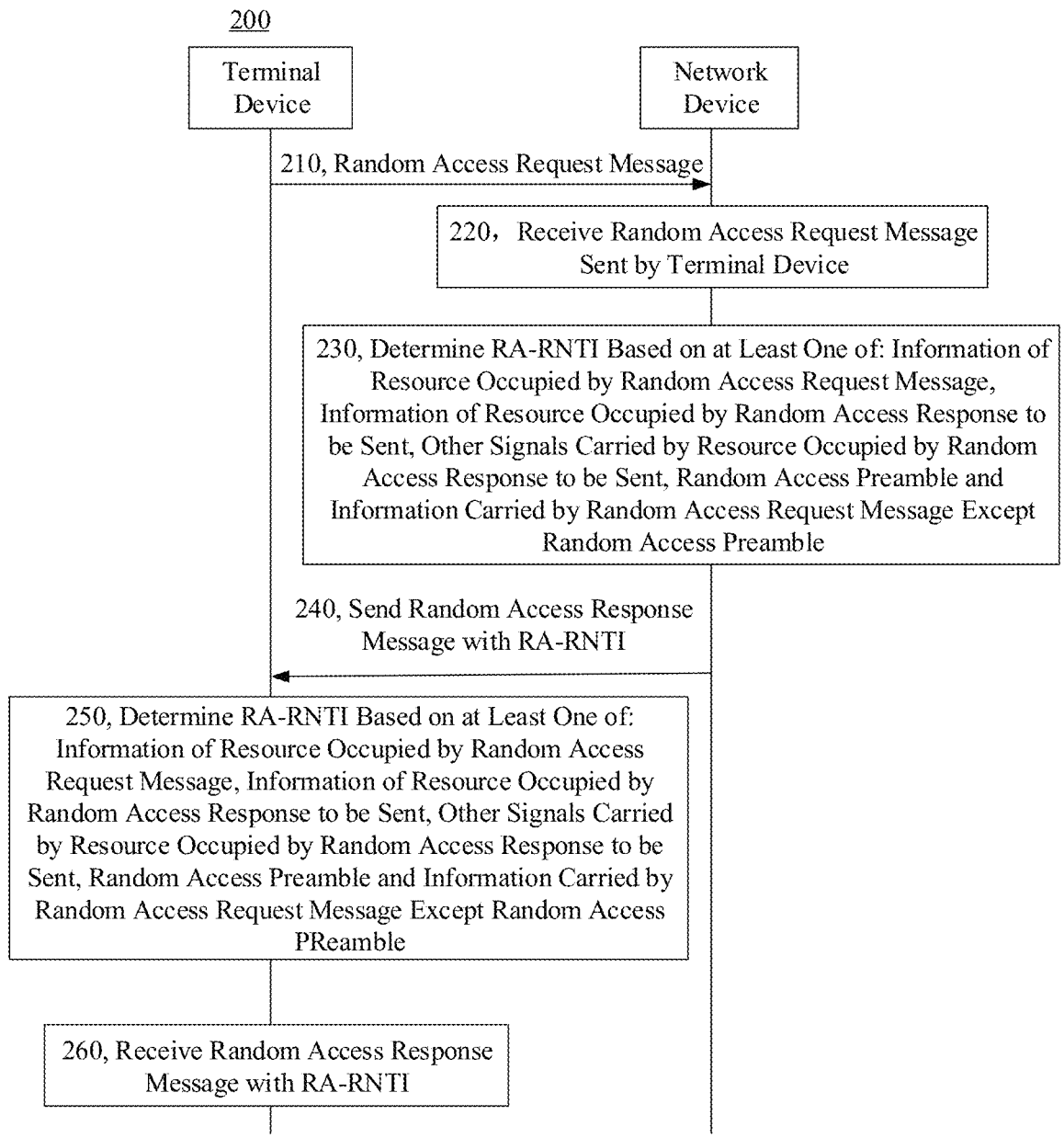
FIG. 2 is a schematic flow chart of a method for random access according to an embodiment of the present application.

FIG. 2 is a schematic flow chart of a communication method 200 according to an embodiment of the present application. As shown in FIG. 2, the method 200 includes the following.

At 210, a terminal device sends a random access request message to a network device, wherein the random access request message carries a random access preamble.

Optionally, in exemplary embodiments of the present application, the terminal device may send the access request message to the network device in a manner of multibeam.

When the terminal device sends the random access request message in the manner of multibeam, positions of starting subframes of different beams may be different.

Optionally, in an embodiment of the present application, after sending the random access request message through a beam, the terminal device may wait for the random access response message sent by the network device. If the random access response message sent by the network device is not received, the terminal device sends the random access request message using another beam, and waits for the random access response message sent by the network device. If the random access response message sent by the network device is received, the terminal device stops sending the random access request message. Otherwise, the terminal device chooses a beam again to send the random access request message.

Optionally, in an embodiment of the present application, the terminal device may choose a beam from multiple beams to send the random access request message based on a quality of signal in each beam of the multiple beams.

For example, the terminal device may determine a beam which carries a signal with the best quality as a beam for sending the random access request message.

Optionally, in an embodiment of the present application, the terminal device may also choose the beam which the network device is expected to use for sending the random access response message.

Specifically, the terminal device may choose a beam from multiple beams based on a quality of signal of the downlink signal in each beam of the multiple beams, as a beam which the network device is expected to use for sending the random access response message.

For example, the terminal device may determine a beam which carries a downlink signal with the best quality as a beam which the network device is expected to use for sending the random access response message.

Optionally, in an embodiment of the present application, the terminal device may have the random access request message carried in a beam which the network device is expected to use for sending the random access response message. Then the network device may determine the beam in which the random access request message is carried, as a beam which the terminal device expects the network device to use for sending the random access response message.

Optionally, in an embodiment of the present application, the terminal device may also have information indicating a beam which the terminal device expects the network device to use for sending the random access response message carried in the random access request message. Then the network device may determine the beam which the terminal device expects the network device to use for sending the random access response message, based on the information carried in the random access request message.

Optionally, in an embodiment of the present application, the terminal device may also have identification information of the terminal device carried in the random access request message.

Optionally, in an embodiment of the present application, the random access request message may also carry only the random access preamble. As such, the random access preamble is the random access request message.

At 220, the network device receives a random access request message sent by the terminal device.

At 230, the network device determines the RA-RNTI based on at least one of: information of resource occupied by the random access request message, information of resource occupied by a random access response to be sent, other signals carried by the resource occupied by the random access response to be sent, the random access preamble and information carried by the random access request message except the random access preamble.

Optionally, among the information used for determining the RA-RNTI, the information of the resource occupied by the random access request message comprises at least one of: information of resource in time domain, information of resource in frequency domain and information of an uplink beam occupied by the random access request message.

Specifically, the information of resource in time domain occupied by the random access request message may be information of a radio frame, information of a subframe or information of a time slot occupied by the random access code.

For example, it may be number of the first radio frame or the last radio frame occupied by the random access request message. Alternatively, it may be number of the first subframe or the last subframe occupied by the random access request message, wherein the number of a subframe may be the number of the subframe in the radio frame. Alternatively, it may be number of the first time slot or the last time slot occupied by the random access request message, wherein the number of a time slot may refer to the number of the time slot in the subframe or in the radio frame.

Specifically, the information of resource in frequency domain occupied by the random access request message may be number of the first or last subband or number of the first or last Physical Resource Block (PRB) occupied by the random access request message.

Specifically, the information of the uplink beam occupied by the random access request message may be number of the uplink beam or number of a beam group to which the uplink beam belongs.

Optionally, among the information used for determining the RA-RNTI, the information of the resource for sending the random access response message comprises information of a downlink beam for sending the random access response message. The information of a downlink beam for sending the random access response message may comprise number of the downlink beam and/or number of a beam group to which the downlink beam belongs.

The network device may use the downlink beam which is expected by the terminal device as a beam for sending the random access response message. Alternatively, the network device may also choose a beam for sending the random access response message from multiple beams based on qualities of signals carried in the multiple beams and/or interference suffered by each beam. Alternatively, the network device may also determine a beam used to send the random access response message by making a reference to the downlink beam which is expected by the terminal device, and making a reference to qualities of signals carried in the multiple beams and/or interference suffered by each beam. For example, only when the quality of a signal of the downlink beam which is expected by the terminal device is greater than or equal to a preset value, the downlink beam which is expected by the terminal device will be used as the beam for sending the random access response message. Otherwise, a beam for sending the random access response message is chosen again from the multiple beams.

Optionally, among the information used for determining the RA-RNTI, the information carried by the random access request message except the random access preamble comprises at least one of: an identifier of the terminal device, and information of the downlink beam which the terminal device expects the network device to use. The information of the downlink beam which the terminal device expects the network device to use may include number of the downlink beam which the terminal device expects the network device to use and/or number of a beam group to which the downlink beam belongs.

Optionally, the RA-RNTI may be determined based on number of the random access preamble.

Optionally, the RA-RNTI may be determined based on information of the resource occupied by the random access request message and/or a beam corresponding to the random access preamble.

Specifically, different resources and/or random access preambles may be corresponding to different beams. After determining a beam, the terminal device may obtain the resource and/or random access preamble corresponding to the beam, and send the random access request message.

The information of resource occupied by the random access request message and/or the beam corresponding to the random access preamble may be a downlink beam which the terminal device expects the network device to use for sending the random access response.

Optionally, when the downlink beam which the terminal device expects the network device to use is different from the downlink beam which carries the random access response, the RA-RNTI may be determined based on information of the downlink beam which the terminal device expects the network device to use; or the RA-RNTI is determined based on information of the downlink beam which carries the random access response.

Specifically, as to whether the RA-RNTI is determined based on the information of the downlink beam which the terminal device expects the network device to use, or based on the information of the downlink beam of the random access response, it may be determined by negotiations between the terminal device and the network device, or may also be in accordance with provisions of a protocol.

Optionally, in an embodiment of the present application, the following information in the other signals carried by the resource occupied by the random access response may be used to determine the RA-RNTI: an index of a reference signal carried by a downlink beam occupied by the random access response to be monitored.

Optionally, the beams and patterns of the reference signals may have a one-to-one correspondence, or the beam groups and the patterns of the reference signals may have a one-to-one correspondence. The patterns of the reference signals of different indexes may be different.

Optionally, in an embodiment of the present application, when sending the random access request message in a manner of multibeam, the terminal device may determine a unique RA-RNTI corresponding to the random access request message sent in the manner of multibeam based on at least one of: information of resource in frequency domain occupied by the random access request message, information of a starting radio frame occupied by the random access request message and the information carried by the random access request message except the random access preamble.

Specifically, when sending the random access request message in the manner of multibeam, the terminal device does not know which random access request message sent by a corresponding beam will be received by the network device. When sending the random access request message using various beams, starting subframes corresponding to various beams are different. Thus, if using number of a subframe to determine the RA-RNTI, there will be a case that multiple beams correspond to multiple RA-RNTI. Then the terminal device will need to try using the multiple RA-RNTI to monitor the random access response message, which increases the processing burden on the terminal device.

When sending the random access request message by using multiple beams, resource in frequency domain and/or the starting radio frame occupied by each beam are the same.

Therefore, in an embodiment of the present application, a unique RA-RNTI may be determined by determining the RA-RNTI based on at least one of: information of a starting radio frame occupied by the random access request message, information of frequency domain occupied by the random access request message and information carried by the random access request message except the random access preamble. The terminal device may utilize the unique RA-RNTI to monitor the random access response message, which may reduce the processing burden on the terminal device.

Optionally, in an embodiment of the present application, the RA-RNTI may be determined based on the formula 1 as below:

$$\text{RA-RNTI} = a + b*f(x) + c*f(y) + d*f(z) + e*f(\text{ue\_id}) \quad \text{Formula 1}$$

wherein: a, b, c, d and e are integers. Specifically, each of them is a positive integer.

f (x) represents a function in which information of resource in time domain occupied by the random access request message is a variable;

f (y) represents a function in which information of resource in frequency domain occupied by the random access request message is a variable;

f (z) represents a function in which information of an uplink beam occupied by the random access request message is a variable, or a function in which information of a downlink beam occupied by the random access response message is a variable, or a function in which information of a reference signal carried in an uplink beam occupied by the random access request message is a variable, or a function in which information of a downlink beam the terminal device expects the network device to use, which is carried in the random access request message, is a variable, or a function in which information of the resource occupied by the random access request message and/or a beam corresponding to the random access preamble is a variable;

f (ue_id) represents a function in which an identifier of the terminal device carried in the random access request message is a variable.

Optionally, the function f ( ) represents a rounding function, a modulus function or an identity function.

For example, f (x)=x; or f (x)=x mod M, wherein the mod represents a modulus operation, and the value of M may be stipulated in a protocol or determined based on system information; or f (x)=floor (x), wherein the floor represents a rounding down operation.

For example, f (y)=y; or f (y)=y mod M, wherein the mod represents a modulus operation, and the value of M may be stipulated in a protocol or determined based on system information; or f (y)=floor (y), wherein the floor represents a rounding down operation.

For example, f (z)=z; or f (z)=z mod M, wherein the mod represents a modulus operation, and the value of M may be stipulated in a protocol or determined based on system information; or f (z)=floor (z), wherein the floor represents a rounding down operation.

For example, f (ue_id)=ue_id; or f (ue_id)=ue_id mod M, wherein the mod represents a modulus operation, and the value of M may be stipulated in a protocol or determined based on system information; or f (ue_id)=floor (ue_id), wherein the floor represents a rounding down operation.

It should be understood that in the above formulas, the functions corresponding to different variables may be the same function. For example, f (x), f (y), f (z) and f (ue_id) may all be identity functions. Alternatively, the functions corresponding to different variables may be different functions. For example, f (x) and f (y) are identity functions, while f (z) and f (ue_id) may be rounding functions or modulus functions.

For ease of understanding the present application more clearly, how to determine the RA-RNTI will be described in conjunction with formulas 2-10 below, wherein the formulas 2-10 in the following may be called as concrete implementations of the formula 1. The formula 1 may have other implementation manners, which will not be described herein.

Optionally, the RA-RNTI is determined based on the formula 2 as below:

$$\text{RA-RNTI} = a + c*f(y) + d*f(\text{Beam\_id}) \quad \text{Formula 2}$$

wherein a is an integer, c and d are non-zero integers;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the RA-RNTI is determined based on the formula 3 as below:

$$\text{RA-RNTI}=a+c*f(y)+d*f(\text{RS\_index}) \quad \text{Formula 3}$$

wherein a is an integer, c and d are non-zero integers;

f (y) represents a function in which information of resource in frequency domain occupied by the random access request message is a variable;

f (RS_index) represents a function in which information of a reference signal carried in a downlink beam occupied by the random access response message is a variable.

Optionally, the RA-RNTI is determined based on the formula 4 as below:

$$\text{RA-RNTI}=a+c*f\_\text{id}+d*f(\text{Beam\_id}) \quad \text{Formula 4}$$

wherein a is an integer, c and d are non-zero integers;

wherein f_id represents information of resource in frequency domain occupied by the random access request message;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the RA-RNTI is determined based on the formula 5 as below:

$$\text{RA-RNTI}=a+d*f(\text{Beam\_id}) \quad \text{Formula 5}$$

wherein a is an integer, d is a non-zero integer;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable.

Optionally, the RA-RNTI is determined based on the formula 6 as below:

$$\text{RA-RNTI}=a+e*f(\text{ue\_id}) \quad \text{Formula 6}$$

wherein a is an integer, e is a non-zero integer;

f (ue_id) represents a function in which an identifier of the terminal device carried in the random access request message is a variable.

Optionally, the RA-RNTI is determined based on the formula 7 as below:

$$\text{RA-RNTI}=a+b*f(\text{SFN\_id})+c*f(y)+d*f(\text{Beam\_id}) \quad \text{Formula 7}$$

wherein a is an integer, b, c and d are non-zero integers;

f (SFN_id) represents a function in which information of a radio frame occupied by the random access request message is a variable;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the RA-RNTI is determined based on the formula 8 as below:

$$\text{RA-RNTI}=a+b*f(\text{SFN\_id})+c*f(y) \quad \text{Formula 8}$$

wherein a is an integer, b and c are non-zero integers;

f (SFN_id) represents a function in which information of a radio frame occupied by the random access request message is a variable;

f (y) represents a function in which information of resource in frequency domain occupied by the random access request message is a variable.

Optionally, the RA-RNTI is determined based on the formula 9 as below:

$$\text{RA-RNTI}=a+b*f(\text{slot\_id})+c*f(y) \quad \text{Formula 9}$$

wherein a is an integer, b, and c are non-zero integers;

f (slot_id) represents a function in which information of a time slot occupied by the random access request message is a variable;

f (y) represents a function in which information of resource in frequency domain occupied by the random access request message is a variable.

Optionally, the RA-RNTI is determined based on the formula 10 as below:

$$\text{RA-RNTI}=a+b*f(\text{slot\_id},\text{SFN\_id})+c*f(y) \quad \text{Formula 10}$$

wherein a is an integer, b and c are non-zero integers;

f (slot_id, SFN_id) represents a function in which information of a time slot and information of a radio frame occupied by the random access request message are variables;

f (y) represents a function in which information of resource in frequency domain occupied by the random access request message is a variable.

It should be understood that as for the specific description of each variable in each function as above, reference may be made to the above description, which will be omitted herein for conciseness.

At 240, the network device sends the random access response to be sent to the terminal device with the RA-RNTI.

Optionally, the network device may scramble the random access request message with the RA-RNTI.

Optionally, the random access response may carry a detected index number of the preamble access sequence code, information of time adjustment for the uplink synchronization, initial allocation of uplink resource and temporary Cell Radio Network the Temporary Identifier (C-RNTI).

At 250, the terminal device determines the Random Access-Radio Network Temporary Identifier (RA-RNTI) based on at least one of: information of resource occupied by the random access request message, information of resource occupied by a random access response to be monitored, other signals carried by the resource occupied by the random access response to be monitored, and information carried by the random access request message except the random access preamble.

Optionally, as for the manner in which the terminal device determines the RA-RNTI, reference can be made to the manner in which the network device determines the RA-RNTI as described above.

Optionally, the manner in which the terminal device determines the RA-RNTI may be consistent with the manner in which the network device determines the RA-RNTI, which will be omitted herein for conciseness.

At 260, the terminal device monitors a random access response to be monitored, which is sent from the network device, with the RA-RNTI.

Specifically, after determining the RA-RNTI, the terminal device may further determine whether the random access response message is for the terminal device itself based on the index number of the preamble access sequence code carried by the random access response message after the random access response message is descrambled.

Optionally, in an embodiment of the present application, if the random access request message sent by the terminal device carries the identification information of the terminal device, the random access response message may also carry an identifier of the terminal device. As such, the terminal device may further determine whether the random access response message is for the terminal device itself based on the identifier of the terminal device in the random access response message.

Optionally, when the identifier of the terminal device is carried in both the random access request message and the random access response, the C-RNTI carried in the random access response message may be a non-temporary C-RNTI but a C-RNTI which can be used by itself.

Therefore, in embodiments of the present application, a Random Access-Radio Network Temporary Identifier (RA-RNTI) is determined based on at least one of: information of resource occupied by the random access request message, information of resource occupied by a random access response to be monitored, other signals carried by the resource occupied by the random access response to be monitored, the random access preamble and information carried by the random access request message except the random access preamble, which may enable the terminal device obtain the random access response message correctly.

Figure 3:
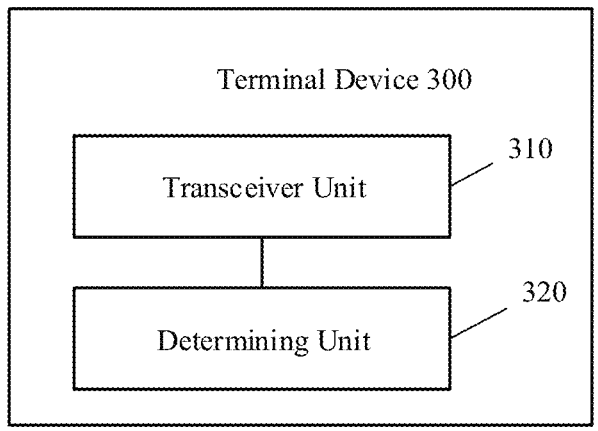
FIG. 3 is a schematic block diagram of a terminal device according to an embodiment of the present application.

FIG. 3 is a schematic block diagram of a terminal device 300 according to an embodiment of the present application. As shown in FIG. 3, the terminal device 300 includes a transceiver unit 310 and a determining unit 320; wherein, the transceiver unit 310 is configured to: send a random access request message to a network device, wherein the random access request message carries a random access preamble;

the determining unit 320 is configured to: determine a Random Access-Radio Network Temporary Identifier (RA-RNTI) based on at least one of: information of resource occupied by the random access request message, information of resource occupied by a random access response to be monitored, other signals carried by the resource occupied by the random access response to be monitored, the random access preamble and information carried by the random access request message except the random access preamble;

the transceiver unit 310 is further configured to: monitor, with the RA-RNTI, the random access response to be monitored which is sent by the network device.

Optionally, the information carried by the random access request message except the random access preamble comprises at least one of:

an identifier of the terminal device, and information of a downlink beam which the terminal device expects the network device to use.

Optionally, the information of the downlink beam which the terminal device expects the network device to use comprises: number of the downlink beam which the terminal device expects the network device to use and/or number of a beam group to which the downlink beam belongs.

Optionally, the downlink beam which the terminal device expects the network device to use is determined by the terminal device from multiple beams based on signal qualities of signals carried in the multiple beams.

Optionally, the information of resource occupied by the random access request message comprises at least one of:

information of resource in time domain, information of resource in frequency domain and information of an uplink beam occupied by the random access request message.

Optionally, the information of the uplink beam occupied by the random access request message comprises number of the uplink beam or number of a beam group to which the uplink beam belongs; and/or the information of resource in time domain occupied by the random access request message comprises number of a radio frame, and/or number of a time slot occupied by the random access request message.

Optionally, the information of resource occupied by a random access response to be monitored comprises:

information of a downlink beam occupied by the random access response to be monitored.

Optionally, the information of the downlink beam comprises number of a beam group to which the downlink beam belongs, or number of the downlink beam.

Optionally, the RA-RNTI is determined based on following information of the other signals carried by the resource occupied by the random access response to be monitored:

an index of a reference signal carried by a downlink beam occupied by the random access response to be monitored.

Optionally, the transceiver unit 310 is further configured to: send the random access request message in a manner of multibeam.

The determining unit 320 is further configured to: determine a unique RA-RNTI corresponding to the random access request message sent in the manner of multibeam based on at least one of: information of a starting radio frame occupied by the random access request message, information of frequency domain occupied by the random access request message and the information carried by the random access request message except the random access preamble;

the transceiver unit 310 is further configured to: monitor the random access response to be monitored with the unique RA-RNTI.

Optionally, the determining unit 320 is further configured to:

determine the RA-RNTI based on information of the resource occupied by the random access request message and/or a beam corresponding to the random access preamble.

Optionally, the resource occupied by the random access request message and/or the beam corresponding to the random access preamble is a downlink beam which the terminal device expects the network device to use.

Optionally, when the downlink beam which the terminal device expects the network device to use is different from a downlink beam which carries the random access response to be monitored, the determining unit 320 is further configured to:

determine the RA-RNTI based on information of the downlink beam which the terminal device expects the network device to use; or determine the RA-RNTI based on information of the downlink beam which carries the random access response to be monitored.

Optionally, the determining unit 320 is further configured to:

determine the RA-RNTI based on a formula as below:

$$\text{RA-RNTI}=a+b*f(x)+c*f(y)+d*f(z)+e*f(\text{ue\_id})$$

wherein: a, b, c, d and e are integers;

f (x) represents a function in which information of resource in time domain occupied by the random access request message is a variable;

f (y) represents a function in which information of resource in frequency domain occupied by the random access request message is a variable;

f (z) represents a function in which information of an uplink beam occupied by the random access request message is a variable, or a function in which information of a downlink beam occupied by the random access response message is a variable, or a function in which information of a reference signal carried in an uplink beam occupied by the random access request message is a variable, or a function in which information of a downlink beam the terminal device expects the network device to use, which is carried in the random access request message, is a variable, or a function in which information of the resource occupied by the random access request message and/or a beam corresponding to the random access preamble is a variable;

f (ue_id) represents a function in which an identifier of the terminal device carried in the random access request message is a variable.

Optionally, the determining unit 320 is further configured to:

determine the RA-RNTI based on a formula as below:

$$\text{RA-RNTI}=a+c*f(y)+d*f(\text{Beam\_id});$$

wherein a is an integer, c and d are non-zero integers;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 320 is further configured to:

determine the RA-RNTI based on a formula as below:

$$\text{RA-RNTI}=a+c*f(y)+d*f(\text{RS\_index});$$

wherein a is an integer, c and d are non-zero integers;

f (y) represents a function in which information of resource in frequency domain occupied by the random access request message is a variable;

f (RS_index) represents a function in which information of a reference signal carried in a downlink beam occupied by the random access response message is a variable.

Optionally, the determining unit 320 is further configured to:

determine the RA-RNTI based on a formula as below:

$$\text{RA-RNTI}=a+c*f\_\text{id}+d*f(\text{Beam\_id});$$

wherein a is an integer, c and d are non-zero integers;

wherein f_id represents information of resource in frequency domain occupied by the random access request message;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 320 is further configured to:

determine the RA-RNTI based on a formula as below:

$$\text{RA-RNTI}=a+d*f(\text{Beam\_id});$$

wherein a is an integer, d is a non-zero integer;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 320 is further configured to:

determine the RA-RNTI based on a formula as below:

$$\text{RA-RNTI}=a+e*f(\text{ue\_id})$$

wherein a is an integer, e is a non-zero integer;

f (ue_id) represents a function in which an identifier of the terminal device carried in the random access request message is a variable.

Optionally, the determining unit 320 is further configured to:

determine the RA-RNTI based on a formula as below:

$$\text{RA-RNTI}=a+b*f(\text{SFN\_id})+c*f(y)+d*f(\text{Beam\_id});$$

wherein a is an integer, b, c and d are non-zero integers;

f (SFN_id) represents a function in which information of a radio frame occupied by the random access request message is a variable;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 320 is further configured to:

determine the RA-RNTI based on a formula as below:

$$\text{RA-RNTI} = a + b*f(\text{SFN\_id}) + c*f(y);$$

wherein a is an integer, b, and c are non-zero integers;

f (SFN_id) represents a function in which information of a radio frame occupied by the random access request message is a variable;

f (y) represents a function in which information of resource in frequency domain occupied by the random access request message is a variable.

Optionally, the determining unit 320 is further configured to:

determine the RA-RNTI based on a formula as below:

$$\text{RA-RNTI} = a + b*f(\text{slot\_id}) + c*f(y);$$

wherein a is an integer, b, and c are non-zero integers;

f (slot_id) represents a function in which information of a time slot occupied by the random access request message is a variable;

f (y) represents a function in which information of resource in frequency domain occupied by the random access request message is a variable.

Optionally, the determining unit 320 is further configured to:

determine the RA-RNTI based on a formula as below:

$$\text{RA-RNTI} = a + b*f(\text{slot\_id}, \text{SFN\_id}) + c*f(y);$$

wherein a is an integer, b and c are non-zero integers;

f (slot_id, SFN_id) represents a function in which information of a time slot and information of a radio frame occupied by the random access request message are variables;

f (y) represents a function in which information of resource in frequency domain occupied by the random access request message is a variable.

Optionally, the function f ( ) represents a rounding function, a modulus function or an identity function.

It should be understood that the terminal device 300 can be corresponding to that terminal device in the method 200 and can implement corresponding functions of that terminal device, which are omitted herein for the sake of brevity.

Figure 4:
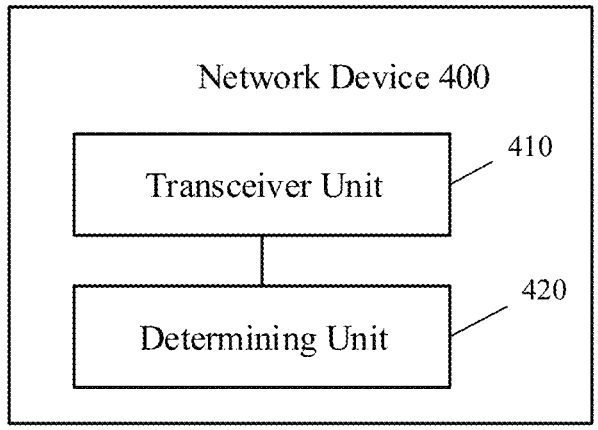
FIG. 4 is a schematic block diagram of a network device according to an embodiment of the present application.

FIG. 4 is a schematic block diagram of a network device 400 according to an embodiment of the present application. As shown in FIG. 4, the network device 400 includes a transceiver unit 410 and a determining unit 420; wherein, the transceiver unit 410 is configured to: receive a random access request message sent by a network device, wherein the random access request message carries a random access preamble;

the determining unit 420 is configured to: determine a Random Access-Radio Network Temporary Identifier (RA-RNTI) based on at least one of: information of resource occupied by the random access request message, information of resource occupied by a random access response to be sent, other signals carried by the resource occupied by the random access response to be sent, the random access preamble and information carried by the random access request message except the random access preamble;

the transceiver unit 410 is further configured to: send the random access response to be sent to the terminal device with the RA-RNTI.

Optionally, the information carried by the random access request message except the random access preamble comprises at least one of:

an identifier of the terminal device, and information of a downlink beam which the terminal device expects the network device to use.

Optionally, the information of the downlink beam which the terminal device expects the network device to use comprises: number of the downlink beam which the terminal device expects the network device to use and/or number of a beam group to which the downlink beam belongs.

Optionally, the information of resource occupied by the random access request message comprises at least one of:

information of resource in time domain, information of resource in frequency domain and information of an uplink beam occupied by the random access request message.

Optionally, the information of the uplink beam occupied by the random access request message comprises number of the uplink beam or number of a beam group to which the uplink beam belongs; and/or the information of resource in time domain occupied by the random access request message comprises number of a radio frame, and/or number of a time slot occupied by the random access request message.

Optionally, the information of resource occupied by a random access response to be monitored comprises:

information of a downlink beam occupied by the random access response to be sent.

Optionally, the information of the downlink beam comprises number of a beam group to which the downlink beam belongs, or number of the downlink beam.

Optionally, the downlink beam occupied by the random access response to be sent is determined by the network device from multiple beams based on interference suffered by each beam or a quality of signal carried in a beam.

Optionally, the RA-RNTI is determined based on following information of the other signals carried by the resource occupied by the random access response to be sent:

an index of a reference signal carried by a downlink beam occupied by the random access response to be sent.

Optionally, the determining unit 420 is further configured to:

determine the RA-RNTI based on at least one of: information of a starting radio frame occupied by the random access request message, information of frequency domain occupied by the random access request message and information carried by the random access request message except the random access preamble.

Optionally, the determining unit 420 is further configured to:

determine the RA-RNTI based on information of the resource occupied by the random access request message and/or a beam corresponding to the random access preamble.

Optionally, the resource occupied by the random access request message and/or the beam corresponding to the random access preamble is a downlink beam which the terminal device expects the network device to use.

Optionally, when a downlink beam which the terminal device expects the network device to use, as indicated by the random access request message, is different from a downlink beam which carries the random access response to be sent, the determining unit 420 is further configured to:

determine the RA-RNTI based on information of the downlink beam which the terminal device expects the network device to use; or determine the RA-RNTI based on information of the downlink beam which carries the random access response to be sent.

Optionally, the determining unit 420 is further configured to:

determine the RA-RNTI based on a formula as below:

$$\text{RA-RNTI} = a + b*f(x) + c*f(y) + d*f(z) + e*f(\text{ue\_id})$$

wherein: a, b, c, d and e are integers;

f (x) represents a function in which information of resource in time domain occupied by the random access request message is a variable;

f (y) represents a function in which information of resource in frequency domain occupied by the random access request message is a variable;

f (z) represents a function in which information of an uplink beam occupied by the random access request message is a variable, or a function in which information of a downlink beam occupied by the random access response message is a variable, or a function in which information of a reference signal carried in a downlink beam occupied by the random access response message is a variable, or a function in which information of a downlink beam the terminal device expects the network device to use, which is carried in the random access request message, is a variable, or a function in which information of the resource occupied by the random access request message and/or a beam corresponding to the random access preamble is a variable;

f (ue_id) represents a function in which an identifier of the terminal device carried in the random access request message is a variable.

Optionally, the determining unit 420 is further configured to:

determine the RA-RNTI based on a formula as below:

$$\text{RA-RNTI} = a + c*f(y) + d*f(\text{Beam\_id});$$

wherein a is an integer, c and d are non-zero integers;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 420 is further configured to:

determine the RA-RNTI based on a formula as below:

$$\text{RA-RNTI} = a + c*f(y) + d*f(\text{RS\_index});$$

wherein a is an integer, c and d are non-zero integers;

f (y) represents a function in which information of resource in frequency domain occupied by the random access request message is a variable;

f (RS_index) represents a function in which information of a reference signal carried in a uplink beam occupied by the random access request message is a variable.

Optionally, the determining unit 420 is further configured to:

determine the RA-RNTI based on a formula as below:

$$\text{RA-RNTI} = a + c*f\_\text{id} + d*f(\text{Beam\_id});$$

wherein a is an integer, c and d are non-zero integers;

wherein f_id represents information of resource in frequency domain occupied by the random access request message;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 420 is further configured to:

determine the RA-RNTI based on a formula as below:

$$\text{RA-RNTI} = a + d*f(\text{Beam\_id});$$

wherein a is an integer, d is a non-zero integer;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 420 is further configured to:

determine the RA-RNTI based on a formula as below:

$$\text{RA-RNTI} = a + e*f(\text{ue\_id})$$

wherein a is an integer, e is a non-zero integer;

f (ue_id) represents a function in which an identifier of the terminal device carried in the random access request message is a variable.

Optionally, the determining unit 420 is further configured to:

determine the RA-RNTI based on a formula as below:

$$\text{RA-RNTI} = a + b*f(\text{SFN\_id}) + c*f(y) + d*f(\text{Beam\_id});$$

wherein a is an integer, b, c and d are non-zero integers;

f (SFN_id) represents a function in which information of a radio frame occupied by the random access request message is a variable;

f (y) represents a function in which information of resource in frequency domain occupied by the random access request message is a variable;

f (Beam_id) represents a function in which information of an uplink beam occupied by the random access request message is a variable, or a function in which information of a downlink beam occupied by the random access response message is a variable, or a function in which information of a downlink beam the terminal device expects the network device to use, which is carried by the random access request message, is a variable, or a function in which information of the resource occupied by the random access request message and/or a beam corresponding to the random access preamble is a variable.

Optionally, the determining unit 420 is further configured to:
determine the RA-RNTI based on a formula as below:

$$RA\text{-}RNTI = a + b*f(SFN\_id) + c*f(y);$$

wherein a is an integer, b, and c are non-zero integers;
f (SFN_id) represents a function in which information of a radio frame occupied by the random access request message is a variable;
f (y) represents a function in which information of resource in frequency domain occupied by the random access request message is a variable.

Optionally, the determining unit 420 is further configured to:
determine the RA-RNTI based on a formula as below:

$$RA\text{-}RNTI = a + b*f(slot\_id) + c*f(y);$$

wherein a is an integer, b, and c are non-zero integers;
f (slot_id) represents a function in which information of a time slot occupied by the random access request message is a variable;
f (y) represents a function in which information of resource in frequency domain occupied by the random access request message is a variable.

Optionally, the determining unit 420 is further configured to:
determine the RA-RNTI based on a formula as below:

$$RA\text{-}RNTI = a + b*f(slot\_id, SFN\_id) + c*f(y);$$

wherein a is an integer, b and c are non-zero integers;
f (slot_id, SFN_id) represents a function in which information of a time slot and information of a radio frame occupied by the random access request message are variables;
f (y) represents a function in which information of resource in frequency domain occupied by the random access request message is a variable.

Optionally, the function f ( ) represents a rounding function, a modulus function or an identity function.

It should be understood that the network device 400 can be corresponding to that network device in the method 200 and can implement corresponding functions of that network device, which are omitted herein for the sake of brevity.

Figure 5:
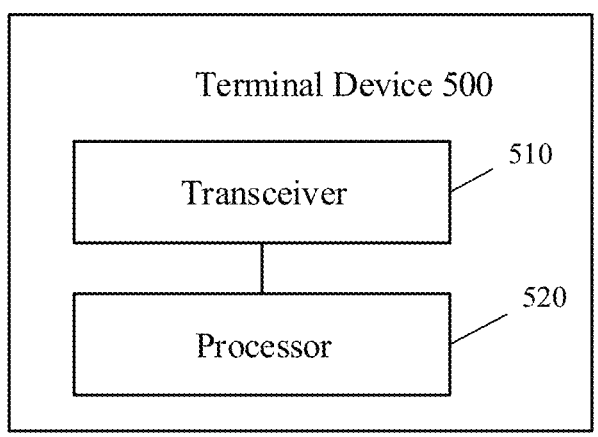
FIG. 5 is a schematic block diagram of a terminal device according to another embodiment of the present application.

FIG. 5 is a schematic block diagram of a terminal device 500 according to another embodiment of the present application. As shown in FIG. 5, the terminal device 500 includes a transceiver 510 and a processor 520.

The transceiver 510 is configured to: send a random access request message to a network device, wherein the random access request message carries a random access preamble; the processor 520 is configured to: determine a Random Access-Radio Network Temporary Identifier (RA-RNTI) based on at least one of: information of resource occupied by the random access request message, information of resource occupied by a random access response to be monitored, other signals carried by the resource occupied by the random access response to be monitored, and information carried by the random access request message except the random access preamble; the transceiver 510 is further configured to: monitor, with the RA-RNTI, the random access response to be monitored which is sent by the network device.

It should be understood that the terminal device 500 can be corresponding to that terminal device in the method 200 and can implement corresponding functions of that terminal device, which are omitted herein for the sake of brevity.

Figure 6:
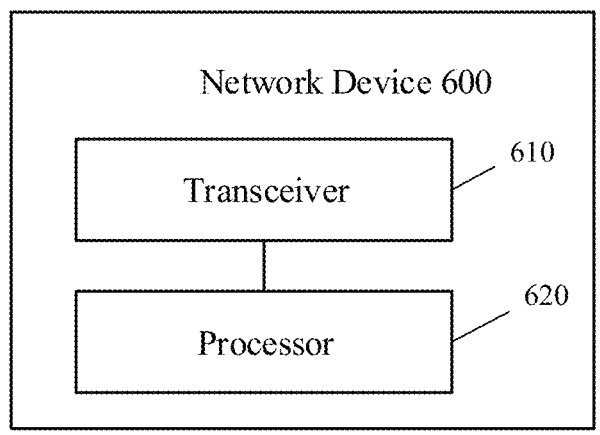
FIG. 6 is a schematic block diagram of a network device according to another embodiment of the present application.

FIG. 6 is a schematic block diagram of a network device 600 according to another embodiment of the present application. As shown in FIG. 6, the network device 600 includes a transceiver 610 and a processor 620.

The transceiver 610 is configured to: receive a random access request message sent by a network device, wherein the random access request message carries a random access preamble; the processor 620 is configured to: determine a Random Access-Radio Network Temporary Identifier (RA-RNTI) based on at least one of: information of resource occupied by the random access request message, information of resource occupied by a random access response to be sent, other signals carried by the resource occupied by the random access response to be sent, and information carried by the random access request message except the random access preamble; the transceiver 610 is further configured to: send the random access response to be sent to the terminal device with the RA-RNTI.

It should be understood that the network device 600 can be corresponding to that network device in the method 200 and can implement corresponding functions of that network device, which are omitted herein for the sake of brevity.

Figure 7:
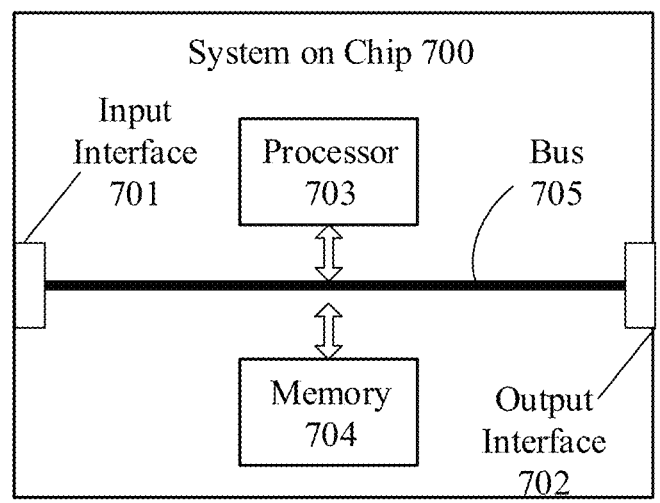
FIG. 7 is a schematic block diagram of a system on chip.

FIG. 7 is a schematic structure diagram of a system on chip (SoC) according to an embodiment of the present application. The Soc 700 of FIG. 7 includes an input interface 701, an output interface 702, a processor 703 and a memory 704, wherein the processor 703 and the memory 704 are connected via a bus 705, and the processor 703 is configured to execute a code in the memory 704.

Optionally, the processor 703 implements, when the code is executed, methods in method embodiments implemented by a terminal device, which are omitted herein for the sake of brevity.

Optionally, the processor 703 implements, when the code is executed, methods in method embodiments implemented by a network device, which are omitted herein for the sake of brevity.

It may be appreciated by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A method for random access, comprising:
   sending, by a terminal device, a random access request message to a network device, wherein the random access request message carries a random access preamble;
   determining a Random Access-Radio Network Temporary Identifier (RA-RNTI) based on at least one of: information of resource occupied by the random access request message, information of resource occupied by a random access response to be monitored, other signals carried by the resource occupied by the random access response to be monitored, the random access preamble, and information carried by the random access request message except the random access preamble;
   monitoring, with the RA-RNTI, the random access response to be monitored which is sent by the network device,
   wherein determining a Random Access-Radio Network Temporary Identifier (RA-RNTI) comprises:
   determining the RA-RNTI based on a formula as below:

$$\text{RA-RNTI}=a+b*f(x)+c*f(y)+d*f(z)+e*f(\text{ue\_id})$$

wherein:
   a, b, c, d and e are integers;
   f (x) represents a function in which information of resource in time domain occupied by the random access request message is a variable;
   f (y) represents a function in which information of resource in frequency domain occupied by the random access request message is a variable;
   f (z) represents one of following functions: a function in which information of an uplink beam occupied by the random access request message is a variable, a function in which information of a downlink beam occupied by the random access response message is a variable, a function in which information of a reference signal carried in an uplink beam occupied by the random access request message is a variable, a function in which information of a downlink beam the terminal device expects the network device to use, which is carried in the random access request message, is a variable, and a function in which information of the resource occupied by at least one of the random access request message and a beam corresponding to the random access preamble is a variable;
   f (ue_id) represents a function in which an identifier of the terminal device carried in the random access request message is a variable.

2. The method of claim 1, wherein the information carried by the random access request message except the random access preamble comprises at least one of:
   an identifier of the terminal device, and information of a downlink beam which the terminal device expects the network device to use.

3. The method of claim 1, wherein the information of resource occupied by the random access request message comprises at least one of:
   information of resource in time domain, information of resource in frequency domain and information of an uplink beam occupied by the random access request message.

4. The method of claim 1, wherein the information of resource occupied by a random access response to be monitored comprises:
   information of a downlink beam occupied by the random access response to be monitored.

5. The method of claim 1, wherein sending, by a terminal device, a random access request message to a network device comprises: sending, by the terminal device, the random access request message in a manner of multibeam;
   wherein determining a Random Access-Radio Network Temporary Identifier (RA-RNTI) comprises:
   determining a unique RA-RNTI corresponding to the random access request message sent in the manner of multibeam based on at least one of: information of a starting radio frame occupied by the random access request message, information of frequency domain occupied by the random access request message and the information carried by the random access request message except the random access preamble;
   monitoring, with the RA-RNTI, the random access response to be monitored comprises: monitoring the random access response to be monitored with the unique RA-RNTI.

6. The method of claim 1, wherein determining a Random Access-Radio Network Temporary Identifier (RA-RNTI) comprises:

determining the RA-RNTI based on information of the resource occupied by at least one of the random access request message and a beam corresponding to the random access preamble.

7. The method of claim 6, wherein the resource occupied by at least one of the random access request message and the beam corresponding to the random access preamble is a downlink beam which the terminal device expects the network device to use.

8. The method of claim 2, wherein when the downlink beam which the terminal device expects the network device to use is different from a downlink beam which carries the random access response to be monitored, determining a Random Access-Radio Network Temporary Identifier (RA-RNTI) comprises:
    determining the RA-RNTI based on information of the downlink beam which the terminal device expects the network device to use; or
    determining the RA-RNTI based on information of the downlink beam which carries the random access response to be monitored.

9. The method of claim 1, wherein the function f ( ) represents one of following functions: a rounding function, a modulus function and an identity function.

10. A method for random access, comprising:
    receiving, by a network device, a random access request message sent by a terminal device, wherein the random access request message carries a random access preamble;
    determining a Random Access-Radio Network Temporary Identifier (RA-RNTI) based on at least one of: information of resource occupied by the random access request message, information of resource occupied by a random access response to be sent, other signals carried by the resource occupied by the random access response to be sent, the random access preamble and information carried by the random access request message except the random access preamble;
    sending, by the network device, the random access response to be sent to the terminal device with the RA-RNTI,
    wherein determining a Random Access-Radio Network Temporary Identifier (RA-RNTI) comprises:
        determining the RA-RNTI based on a formula as below:

RA-RNTI=$a+b*f(x)+c*f(y)+d*f(z)+e*f(ue\_id)$ wherein:
            a, b, c, d and e are integers;
            f (x) represents a function in which information of resource in time domain occupied by the random access request message is a variable;
            f (y) represents a function in which information of resource in frequency domain occupied by the random access request message is a variable;
            f (z) represents one of following functions: a function in which information of an uplink beam occupied by the random access request message is a variable, a function in which information of a downlink beam occupied by the random access response message is a variable, a function in which information of a reference signal carried in a downlink beam occupied by the random access response message is a variable, a function in which information of a downlink beam the terminal device expects the network device to use, which is carried in the random access request message, is a variable, and a function in which information of the resource occupied by at least one of the random access request message and a beam corresponding to the random access preamble is a variable;
            f (ue_id) represents a function in which an identifier of the terminal device carried in the random access request message is a variable.

11. The method of claim 10, wherein the information carried by the random access request message except the random access preamble comprises at least one of:
    an identifier of the terminal device, and information of a downlink beam which the terminal device expects the network device to use.

12. The method of claim 10, wherein determining a Random Access-Radio Network Temporary Identifier (RA-RNTI) comprises:
    determining the RA-RNTI based on at least one of: information of a starting radio frame occupied by the random access request message, information of frequency domain occupied by the random access request message and information carried by the random access request message except the random access preamble.

13. A terminal device, comprising a transceiver and a processor, wherein:
    the transceiver is configured to: send a random access request message to a network device, wherein the random access request message carries a random access preamble;
    the processor is configured to: determine a Random Access-Radio Network Temporary Identifier (RA-RNTI) based on at least one of: information of resource occupied by the random access request message, information of resource occupied by a random access response to be monitored, other signals carried by the resource occupied by the random access response to be monitored, the random access preamble and information carried by the random access request message except the random access preamble;
    the transceiver is further configured to: monitor, with the RA-RNTI, the random access response to be monitored which is sent by the network device,
    wherein the processor is further configured to:
        determine the RA-RNTI based on a formula as below:

RA-RNTI=$a+b*f(x)+c*f(y)+d*f(z)+e*f(ue\_id)$ wherein:
            a, b, c, d and e are integers;
            f (x) represents a function in which information of resource in time domain occupied by the random access request message is a variable;
            f (y) represents a function in which information of resource in frequency domain occupied by the random access request message is a variable;
            f (z) represents one of following functions: a function in which information of an uplink beam occupied by the random access request message is a variable, a function in which information of a downlink beam occupied by the random access response message is a variable, a function in which information of a reference signal carried in an uplink beam occupied by the random access request message is a variable, a function in which information of a downlink beam the terminal device expects the network device to use, which is carried in the random access request message, is a variable, and a function in which information of the resource occupied by at least one of the random access request message and a beam corresponding to the random access preamble is a variable;

f (ue_id) represents a function in which an identifier of the terminal device carried in the random access request message is a variable.

14. The terminal device of claim 13, wherein the information carried by the random access request message except the random access preamble comprises at least one of:

an identifier of the terminal device, and information of a downlink beam which the terminal device expects the network device to use.

15. The terminal device of claim 13, wherein the information of resource occupied by the random access request message comprises at least one of:

information of resource in time domain, information of resource in frequency domain and information of an uplink beam occupied by the random access request message.

16. The terminal device of claim 13, wherein the transceiver is further configured to: send the random access request message in a manner of multibeam;

the processor is further configured to: determine a unique RA-RNTI corresponding to the random access request message sent in the manner of multibeam based on at least one of: information of a starting radio frame occupied by the random access request message, information of frequency domain occupied by the random access request message and the information carried by the random access request message except the random access preamble;

the transceiver is further configured to: monitor the random access response to be monitored with the unique RA-RNTI.

17. The terminal device of claim 13, wherein the processor is further configured to:

determine the RA-RNTI based on information of the resource occupied by at least one of the random access request message and a beam corresponding to the random access preamble.

* * * * *